(No Model.) 3 Sheets—Sheet 3.

B. W. BINFORD.
POTATO DIGGER AND RIDGER.

No. 293,403. Patented Feb. 12, 1884.

WITNESSES
F. L. Ourand,
Jno. R. Young.

INVENTOR
B. W. Binford
By H. N. Jenkins
Attorney

UNITED STATES PATENT OFFICE.

BALLARD W. BINFORD, OF RICHMOND, VIRGINIA.

POTATO DIGGER AND RIDGER.

SPECIFICATION forming part of Letters Patent No. 293,403, dated February 12, 1884.

Application filed October 29, 1883. (No model.)

*To all whom it may concern:*

Be it known that I, BALLARD W. BINFORD, a citizen of the United States, residing at Richmond, county of Henrico, State of Virginia, have invented new and useful Improvements in Potato Diggers and Ridgers, of which the following is a full and exact description, reference being had to the accompanying drawings, making part of this specification.

As its title indicates, this invention is designed for preparing lands for planting potatoes and other root crops, for covering and cultivating the same, and for digging the said crops after they have matured.

The invention consists in a two-wheeled vehicle from the axle and main frame of which is suspended a frame carrying adjustable plowing and digging attachments, said frame adapted to be raised by the backing of the machine and of being held at any desired elevation by means of notched or perforated levers and latches or pins, as hereinafter fully described.

My invention further consists in the novel combination and arrangement of parts, all of which are hereinafter fully described and specifically claimed.

Figure 1:
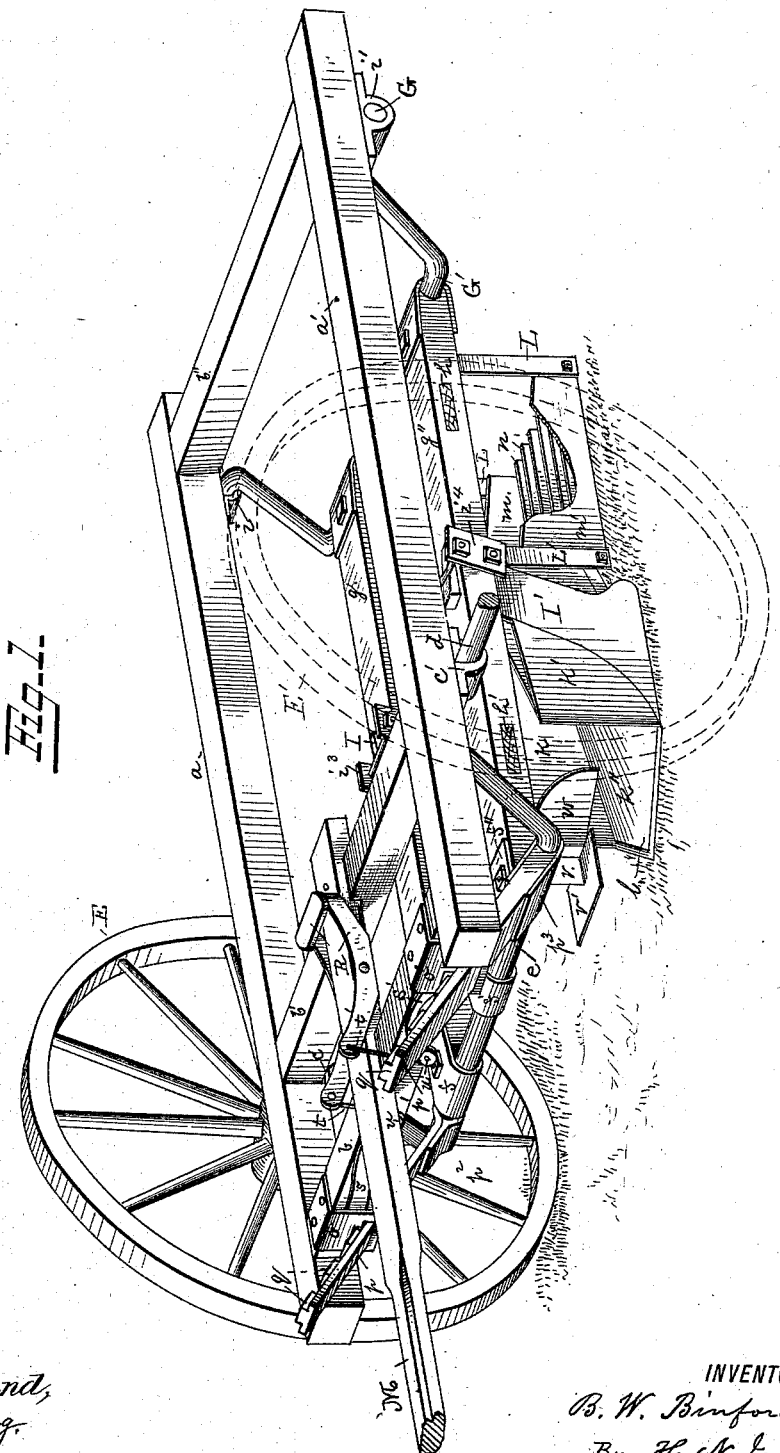
Figure 2:
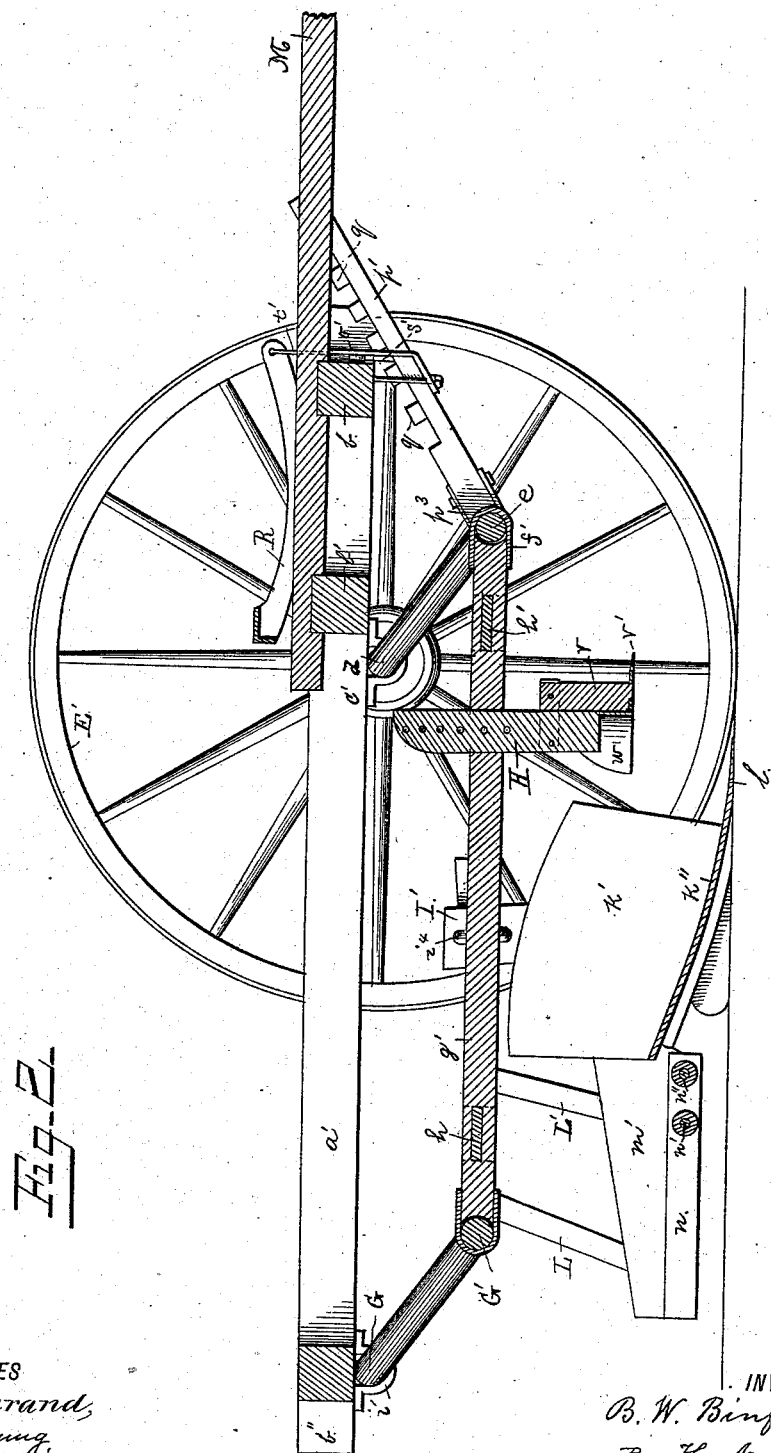
Figure 3:
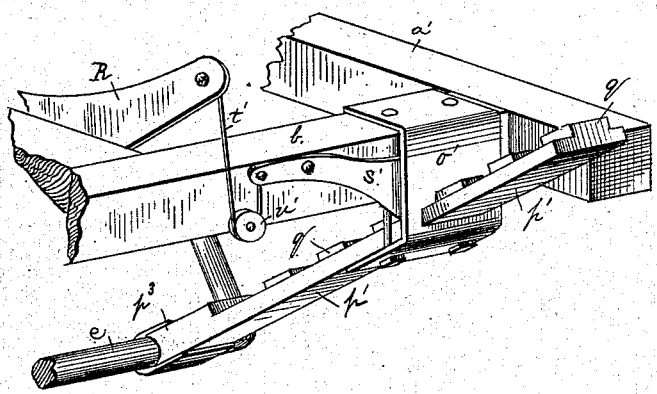
Figure 4:
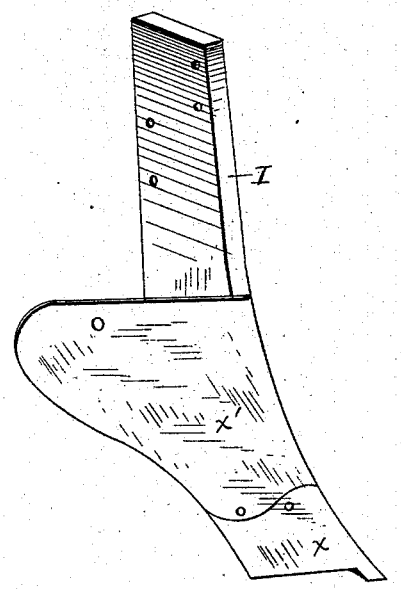
Figure 5:
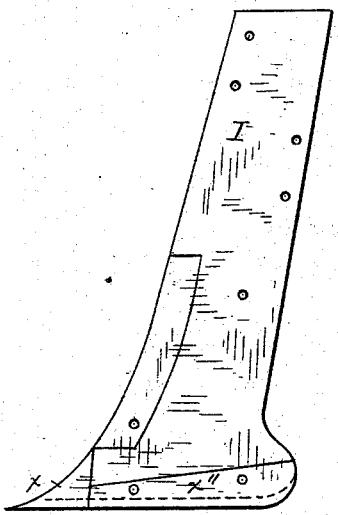

In the accompanying drawings, Figure 1 represents a perspective view of the machine with its nearest wheel omitted, so as to show more clearly the digging and other attachments connected therewith. Fig. 2 is a vertical longitudinal section thereof. Fig. 3 is a detail showing a portion of the main frame with one of the notched levers and locking-catches for securing the lower frame in a raised position. Figs. 4 and 5 are standards for supporting the plowshares or digging attachments employed.

The main frame of the machine is composed of two longitudinal timbers, $a\ a'$, which are secured at requisite distance apart by cross-ties $b\ b'\ b''$. The under sides of the longitudinal pieces are provided with journal-boxes $c\ c'$, for the reception of the journals of an axle, $d$, on the outer ends of which are loosely fitted a pair of traction-wheels, E. Between the aforesaid journals an offset or crank, $e$, is made in the axle, and on this offset is journaled, as shown at $f\ f'\ f''$, the forward end of a suspended frame, which is composed of three longitudinal timbers, $g\ g'\ g''$, that are connected by cross-ties, as shown at $h\ h'$. At the rear of the main frame is secured a pair of journal-boxes, $i\ i'$, in which operate the outer ends of a shaft, G, having an offset similar to that of the main axle, as shown at G', and to which the rear ends of the suspended frame are in a like manner connected. A pair of standards, I I', are secured to the suspended frame either by stirrups, as shown at $i^3\ i^4$, or by any other suitable means. To the lower ends of these standards are separately fitted and secured, when desired, plow-points, turning-board, and landsides, so that any one or more of the said parts can be replaced when rendered useless by wear and tear, or entirely removed when the machine is to be employed in digging potatoes, and for which purpose a pair of side plates, $k\ k'$, are fastened to the adjacent sides of the standards. These plates have their lower edges connected with an inclined plate, $k''$, the forward end of which is provided with a point, as shown at $l$ in Figs. 1 and 2. In rear of the inclined plate aforesaid is suspended, by means of links L L', a pair of side plates, $m\ m'$, between which is secured a grating composed of a number of parallel rods or bars, $n$, that are held in proper position and at requisite distances apart by means of bolts and washers, as shown at $n'\ n''$.

To the front cross-timbers, $b$, of the main frame is securely bolted a pair of brackets, $o\ o'$, having suitable openings therein for the reception of a pair of levers, $p\ p'$, the lower ends of which are connected by strap-joints $p^2\ p^3$, or in any other desired manner, with the forward part of the suspended frame, as shown in Fig. 1. These levers are provided with a number of projection or cross-ridges, $q$, which enables them to be engaged and held at different elevations by locking-catches $s\ s'$, that are pivoted to the forward cross-timbers, $b$, so that their free ends shall operate between the said timber and one side of the stirrups, as shown more clearly in Fig. 3. The opposite ends of the catches are provided with cords $t\ t'$, which are passed around loose sheaves $u\ u'$ and connected with the outer ends of a rocking frame, R, which is designed to be operated by the foot of the driver, whose seat (not shown in the drawings) should be located above the main frame of the machine, and to which it can be secured by means of bolts or other suitable fastenings.

The letter H designates a standard having a series of vertical perforations for the passage of a bolt or pin, whereby it can be secured at any desired elevation in a recess which is formed in the central timber of the suspended frame, as shown in Fig. 2. The lower end of the standard is provided with forwardly-projecting vertical and horizontal cutting blades or edges $r$ $r'$, and with side wings, $w$, for purposes hereinafter more fully described.

To the front end of the main frame of the machine is secured a pole or tongue, M, to which the draft-animals are attached in the usual manner.

In lieu of the projections on the levers $p$ $p'$ and the devices described for engaging and locking the same, a like result may be attained by simply perforating the said levers, so as to adapt them to receive pins, which can be dropped in the perforations immediately in advance of the stirrup or timber $b$; but the arrangement first described will be found to be the most convenient, inasmuch as both levers can be locked or unlocked by the one operation.

Referring to Figs. 4 and 5, the letter $x$ designates a plow-point, $x'$ a turning-board, and $x''$ a landside, all of which are secured to the lower part of the standard in the usual manner.

The operation of my machine is as follows, viz: To prepare the ground for the planting of sweet potatoes, &c., the inclined plate $k''$, with its point $l$, sides $k$ $k'$, and grating $n$, is removed and the standards I I' provided with the points and turning-boards, by means of which ridges are made, upon which the seeds or plants are set out in the customary way. When used for harvesting, the points and mold-boards are removed from the standards and the inclined plate $k''$, with its attachments, secured thereto, as shown. The standard H is then lowered, so as to permit its horizontal cutting-blade to travel through the earth at a distance of about one inch or so from the surface thereof, which severs the vines and tops from the potatoes or roots, the vertical blade in the meantime dividing the same, while the wings throw the severed portions to the sides of the machine, leaving the point of the inclined plate free to operate under the vegetables, and to raise and carry the same back to the grating, where they are separated from the earth, the latter dropping between the bars and the former falling off at the rear thereof, to be afterward gathered either by hand or machinery, as found most expedient.

Having described my invention, what I claim as new, and desire to secure by Letters Patent, is—

1. In combination with the main frame of a potato-digging machine, the axle $d$ and shaft G, having offsets or cranks, and a frame carrying the digging apparatus and grating, said frame connected with the aforesaid cranks, as described, so as to permit of its being raised by the backing of the machine, as set forth.

2. In combination with the main frame of a potato-digging machine, the axle $d$ and shaft G, provided with offsets or cranks, the frame carrying the digging apparatus, said frame connected with the aforesaid offsets or cranks, so as to be raised by the backing of the machine, and the levers $p$ $p'$, with locking means, substantially as described, and for the purpose set forth.

In testimony whereof I affix my signature in presence of two witnesses.

BALLARD W. BINFORD.

Witnesses:
 WARREN C. STONE,
 JNO. R. YOUNG.